UNITED STATES PATENT OFFICE.

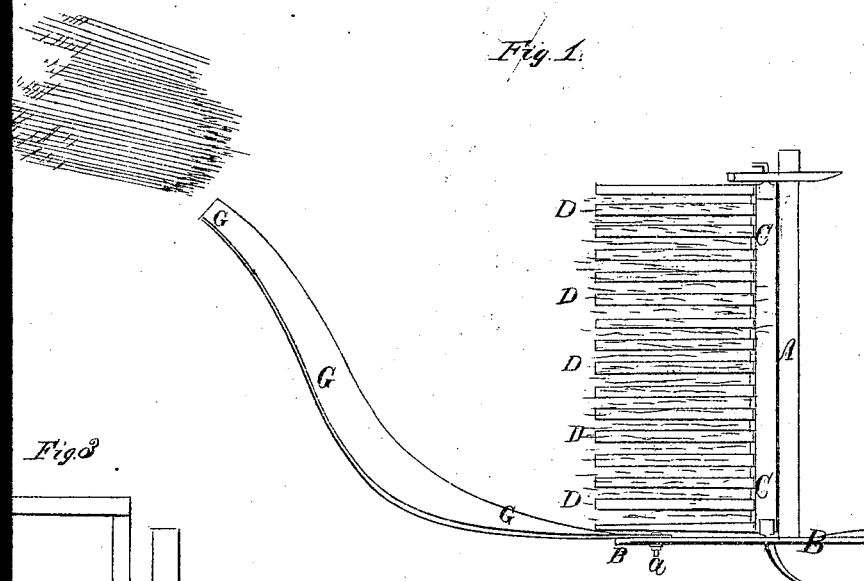
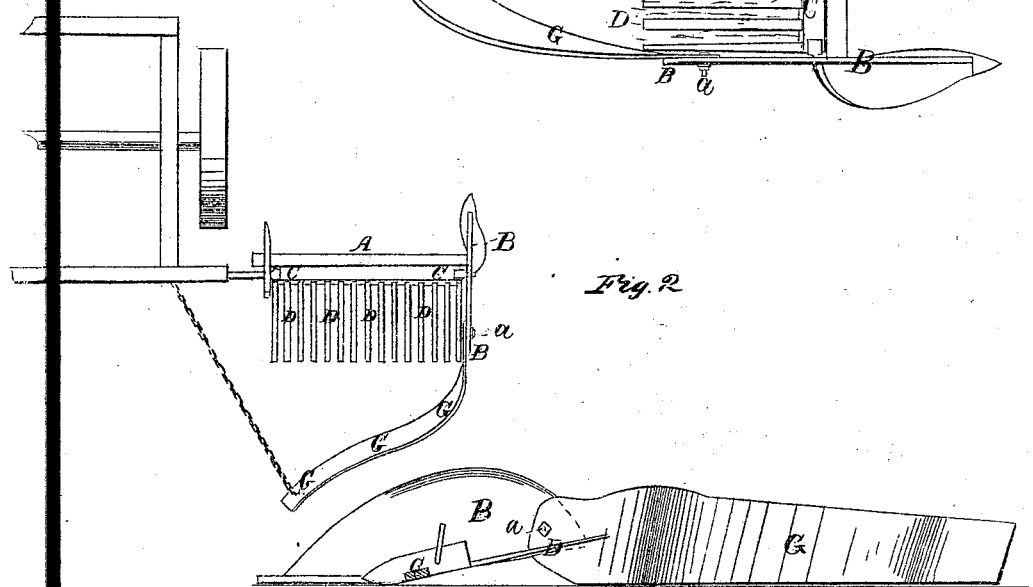

AMOS RANK, OF SALEM, OHIO.

Letters Patent No. 70,614, dated November 5, 1867.

---

IMPROVEMENT IN HARVESTERS.

---

The Schedule referred to in these Letters Patent and making part of the same.

---

TO ALL WHOM IT MAY CONCERN:

Be it known that I, AMOS RANK, of Salem, Columbiana county, State of Ohio, have invented an Improvement on Droppers for Harvesting Machines; and I do hereby declare that the following is a full, clear, and exact description of the same, reference being had to the accompanying drawings, forming part of this specification, in which—

Figure 1 is a plan view, showing the invention applied to a slatted dropper.

Figure 2 is a side elevation of fig. 1.

Similar letters of reference indicate corresponding parts in the two figures.

The invention relates to an improvement on that class of droppers which consist of a vibrating, open-slatted platform, from which the cut grain is delivered upon the ground by the action of the stubble upon it, when the platform is allowed to drop upon the stubble.

The objection to this class of droppers is, that the grain is deposited in rear of and in line with the cutting apparatus, consequently the horses travel over the grain in passing around the field. It is the object of my invention to remedy this objection by having a curved fender arranged on the outer side of an open-slatted platform, which fender extends backward and inward, in the rear of this platform, so as to move the grain as it is dropped upon the ground, and leave it in rear of the draught-frame in a position where it will be out of the way of the team in the succeeding round.

To enable others skilled in the art to understand my invention, I will describe its construction and operation.

In the accompanying drawings, A represents a finger-bar, and B the outer guard and divider. C represents a bar which extends along the rear edge of the finger-bar, and which is pivoted at its ends so as to oscillate freely. D D represent slats or rods, which are secured at their front ends to the oscillating bar C, at suitable distances apart, and which form, in conjunction with said bar, the open-slatted platform, upon which the grain, as it is cut, falls. Provision is made for enabling the attendant to raise the rear end of said platform, as shown in fig. 2, and keep it in this position, free from the stubble, during the operation of cutting a sufficient quantity of grain to form a gavel, and also for allowing the attendant to drop the platform upon the ground, so as to cause the stubble to drag off the grain and deliver the gavels in rear of the cutting apparatus. Where these droppers have been used, a fender or divider is arranged over the finger-bar, so as to rise when the platform drops, for the purpose of preventing the cut grain from falling upon it, and being carried off by the stubble.

My invention consists in attaching to the rear end of the divider B, by means of a pivot or otherwise, a curved plate or board, G, which extends backward and inward, so as to cross the path of the cutting apparatus obliquely, and thus take in the entire cut swath. This curved board G constitutes a scraper for moving the grain laterally from behind the open-slatted platform, and leaving it on the inner side of the cutting apparatus, in such position that it will be out of the way of the team on their succeeding round, in cutting the next swath. To enable this curved scraper or drag G to pass freely over the ground, and conform to the undulations thereof, I have pivoted its forward end to the divider B by a transverse pin, a, which pin allows the scraper to vibrate freely, and adapt itself to all irregularities of surface passed over.

I do not desire to confine myself to the precise form and mode of attachment of the curved scraper G, as any other form of scraper, operating upon the same principle, may be employed. Nor do I desire to confine my invention to the precise construction of rear-delivery dropping attachment, as it is applicable to other forms of droppers which deliver the grain upon the ground, in rear of the cutting apparatus, in the form of masses or gavels.

The scraper will operate equally as well with different forms of rear-delivery droppers, and I have represented its application to the open-slatted platform merely as one practical mode of carrying the invention into effect. In fig. 3 I have represented the dropper applied to a draught-frame, and shown the scraper G connected to said frame by means of a chair, so as to sustain the rear end of said scraper against backward strain or displacement.

Having described my invention, what I claim as new, and desire to secure by Letters Patent, is—

1. The side-delivery scraper, hinged to the outer divider, or its equivalent, so as to allow it to conform to the undulations of the ground, in combination with a grain-platform or receiver, which is arranged behind the cutting apparatus of a harvester, and applied so as not to revolve, substantially as described.

2. A slatted tilting or hinged platform, D, arranged behind the finger-beam of a harvester, in combination with a scraper, G, which operates as shown, for the purpose set forth.

AMOS RANK.

Witnesses:
HENRY C. JONES,
SAMUEL HARDMAN.